US008457928B2

(12) United States Patent
Dang et al.

(10) Patent No.: US 8,457,928 B2
(45) Date of Patent: Jun. 4, 2013

(54) AUTOMATIC DETERMINATION OF DYNAMIC THRESHOLD FOR ACCURATE DETECTION OF ABNORMALITIES

(75) Inventors: Derek Dang, San Jose, CA (US); Alex Lafaive, Sunnyvale, CA (US); Joe Scarpelli, Mountainview, CA (US); Sridhar Sodem, Cupertino, CA (US)

(73) Assignee: BMC Software, Inc., Houston, TX (US)

( * ) Notice: Subject to any disclaimer, the term of this patent is extended or adjusted under 35 U.S.C. 154(b) by 362 days.

(21) Appl. No.: 12/847,391

(22) Filed: Jul. 30, 2010

(65) Prior Publication Data

US 2011/0238376 A1 Sep. 29, 2011

Related U.S. Application Data

(60) Provisional application No. 61/318,135, filed on Mar. 26, 2010.

(51) Int. Cl.
  *G06F 11/30* (2006.01)
  *G06F 11/00* (2006.01)
  *G06Q 10/00* (2012.01)

(52) U.S. Cl.
  USPC ............................ 702/186; 705/7.38; 726/22

(58) Field of Classification Search
  USPC .............. 702/186, 81, 84, 182–183; 705/5–6, 705/7.11–7.22, 7.38–7.39, 7.41; 726/22–25
  See application file for complete search history.

(56) References Cited

U.S. PATENT DOCUMENTS

| | | | |
|---|---|---|---|
| 5,506,955 A | 4/1996 | Chen et al. | |
| 6,306,088 B1 | 10/2001 | Krausman et al. | |
| 6,327,677 B1 | 12/2001 | Garg et al. | |
| 6,453,265 B1 | 9/2002 | Dekhil et al. | |
| 6,816,898 B1 | 11/2004 | Scarpelli et al. | |
| 7,131,037 B1 | 10/2006 | Lefaive et al. | |
| 7,350,209 B2 | 3/2008 | Shum | |
| 2003/0061130 A1 | 3/2003 | Hoffman et al. | |
| 2003/0139905 A1 | 7/2003 | Helsper et al. | |
| 2004/0088400 A1 | 5/2004 | Daggett | |
| 2007/0005297 A1 | 1/2007 | Beresniewicz et al. | |
| 2008/0270071 A1* | 10/2008 | Marvasti et al. | 702/179 |
| 2009/0063390 A1 | 3/2009 | Marvasti | |
| 2010/0020909 A1 | 1/2010 | Jung et al. | |
| 2010/0086933 A1 | 4/2010 | Hospach et al. | |
| 2011/0161048 A1 | 6/2011 | Sodem et al. | |
| 2011/0238376 A1 | 9/2011 | Dang et al. | |
| 2011/0238377 A1 | 9/2011 | Scarpelli et al. | |
| 2011/0246585 A1 | 10/2011 | Scarpelli et al. | |

OTHER PUBLICATIONS

U.S. Appl. No. 12/750,347 Advisory Action mailed Nov. 5, 2012, 3 pages.*
U.S. Appl. No. 12/750,347 Final Office Action mailed Jul. 27, 2012, 18 pages.*

(Continued)

*Primary Examiner* — Toan Le

(57) ABSTRACT

An improved performance management technique allows automatic determination dynamic thresholds of a metric based on a baseline of the matching pattern. A pattern matching process is conducted against a set of baseline patterns to find the matching pattern. If a matching pattern is found, the baseline of the matching pattern is used as the dynamic threshold. A series of sanity checks are performed to reduce any false alarms. If the metric does not follow any pattern, a composite of baselines is selected as the dynamic threshold.

17 Claims, 7 Drawing Sheets

OTHER PUBLICATIONS

U.S. Appl. No. 12/750,347 Non-Final Office Action mailed Apr. 2, 2012, 29 pages.*
U.S. Appl. No. 12/872,871 Non-Final Office Action mailed Aug. 17, 2012, 11 pages.*
Bouhana, et al., "Active Baselining in Passive Data Environments", Fujitsu Austrailia and New Zealand, (2006).

U.S. Appl. No. 12/750,347 Non-Final Office Action mailed Apr.2, 2012, 30 pages.
U.S. Appl. No. 12/750,347 Final Office Action mailed Jul. 27, 2012, 21 pages.
U.S. Appl. No. 12/872,871 Non-Final Office Action mailed Aug. 17, 2012, 12 pages.

* cited by examiner

AUTOMATIC DETERMINATION OF DYNAMIC THRESHOLD FOR ACCURATE DETECTION OF ABNORMALITIES

CROSS-REFERENCE TO RELATED APPLICATIONS

This application claims priority to U.S. Provisional Application Ser. No. 61/318,135 entitled "Automatic Determination of Dynamic Thresholds for Accurate Detection of Abnormalities" filed Mar. 26, 2010, which is hereby incorporated by reference in its entirety. This application is also related to U.S. patent application Ser. No. 12/750,347, entitled "Method to Optimize Prediction of Threshold Violations Using Baselines," filed Mar. 30, 2010 and which is hereby incorporated by reference.

BACKGROUND

This disclosure relates generally to the field of computer systems. More particularly, but not by way of limitation, it relates to a technique for improving performance monitoring systems.

In a large Information Technology (IT) environment where millions of metrics are tracked in order to monitor the health of the overall system, fault isolation can be a very time-consuming and labor-intensive effort. Some performance monitoring software, such as BMC ProactiveNet®, helps in this endeavor by using many components, one of the most significant of which are the abnormality events, which are the objects that denote when the monitored metrics go outside their normal ranges of behavior. (BMC ProactiveNet is a registered trademark of the BMC Software, Inc.) These abnormality events get generated using rules (or thresholds), which specify the normal range of behavior for monitored metrics. The rules utilize specific data patterns (or baselines or dynamic thresholds) to specify normal operating ranges for corresponding metrics and these rules need to be managed by people.

As the infrastructure enlarges, the threshold management task quickly becomes prohibitively more expensive and impractical, since it requires a person with expert domain knowledge to decide what type of dynamic thresholds to use in order for the thresholds to generate the most accurate abnormality events. Because the task is so overwhelming, the users typically avoid it completely and leave all settings as they were "out-of-the-box."

Thus, it would be beneficial to provide a mechanism to automatically determine dynamic thresholds for the monitored metrics for accurate detection of abnormalities.

SUMMARY

Various embodiments provide a mechanism to automatically determine dynamic thresholds of a monitored metric for accurate detection of abnormalities.

In one embodiment, a method is disclosed to automatically determine dynamic threshold for a monitored metric. The method comprises receiving metric data; identifying a set of predetermined baseline patterns of the metric; determining whether the metric data follows one of the baseline patterns and, if a matching pattern is found, performing a series of sanity checks against the baseline of that pattern; and using the baseline of the matching pattern as the dynamic threshold if it passes the sanity checks. If the metric data does not follow any pattern, a composite of baselines may be selected as the dynamic threshold.

In another embodiment, a performance management system is disclosed. The performance management system comprises a processor; an operator display, coupled to the processor; a storage subsystem, coupled to the processor; and software, stored in the storage subsystem, comprising instructions that when executed by the processor cause the processor to perform the method described above.

In yet another embodiment, a non-transitory computer readable medium is disclosed. The non-transitory computer readable medium has instructions for a programmable control device stored thereon wherein the instructions cause the programmable control device to perform the method described above.

In yet another embodiment, a networked computer system is disclosed. The networked computer system comprises a plurality of computers communicatively coupled, at least one of the plurality of computers programmed to perform at least a portion of the method described above wherein the entire method described above is performed collectively by the plurality of computers.

DETAILED DESCRIPTION

Various embodiments provide a mechanism to automatically determine dynamic thresholds for accurate detection of abnormalities in an IT system. According to one embodiment, a performance management system retrieves metric data and matches that data against a set of predetermined baseline patterns. If a matching pattern is found, the performance management system may retrieve the baseline for that pattern, and perform a set of sanity checks on the selected baseline. If the selected baseline passes the sanity checks, the performance management system may use the baseline to dynamically adjust an event threshold. However, if no matching pattern is detected, the performance management system may use a composite of baselines as the new dynamic threshold.

In the following description, for purposes of explanation, numerous specific details are set forth in order to provide a thorough understanding of the invention. It will be apparent to one skilled in the art, however, that the invention may be practiced without these specific details. In other instances, structure and devices are shown in block diagram form in order to avoid obscuring the invention. It will be appreciated that in the development of any actual implementation (as in any development project), numerous decisions must be made to achieve the developers' specific goals (e.g., compliance with system- and business-related constraints), and that these goals will vary from one implementation to another. It will also be appreciated that such development effort might be complex and time-consuming, but would nevertheless be a routine undertaking for those of ordinary skill in the art having the benefit of this disclosure. Moreover, the language used in this disclosure has been principally selected for readability and instructional purposes, and may not have been selected to delineate or circumscribe the inventive subject matter, resort to the claims being necessary to determine such inventive subject matter. Reference in the specification to "one embodiment" or to "an embodiment" means that a particular feature, structure, or characteristic described in connection with the embodiments is included in at least one embodiment of the invention, and multiple references to "one embodiment" or "an embodiment" should not be understood as necessarily all referring to the same embodiment.

Figure 1:
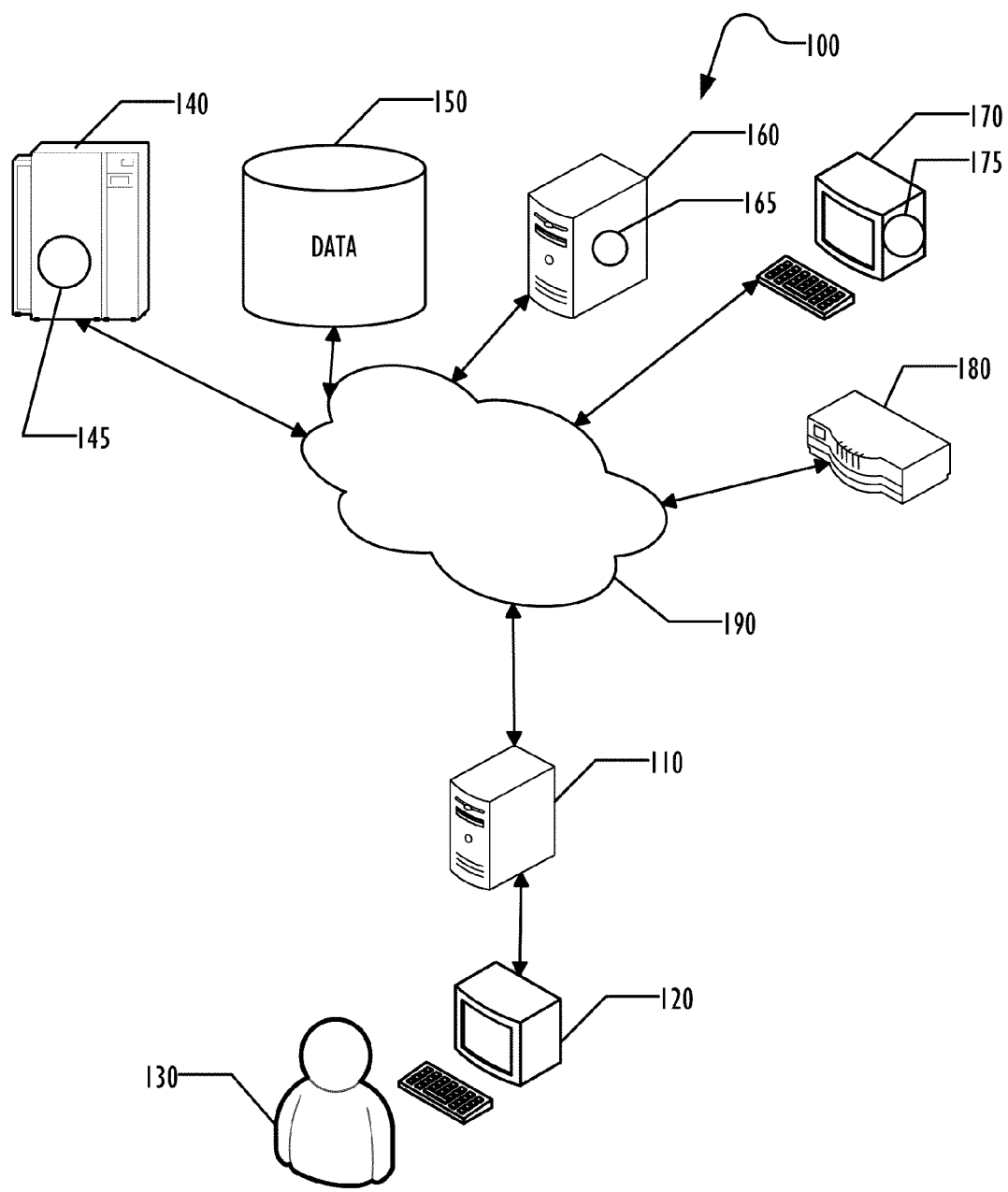
FIG. 1 illustrates, in block diagram form, an example IT infrastructure monitored using a technique for automatically determining dynamic threshold for accurate detection of abnormalities.

FIG. 1 is a block diagram illustrating example IT system 100 that employs performance monitoring in accordance with techniques described herein. An application executing in computer 110 may collect and monitor performance data from a number of IT system elements, including mainframe 140 and application 145 running thereon, data storage system 150 such as a storage area network, server 160 and application 165 running thereon, workstation 170 and application 175 running thereon, and router 180. As shown, system 100 uses network 190 for communication of monitoring data to monitoring computer 110. In some embodiments, however, some or all of the monitored devices may be directly connected to monitoring computer 110. These system elements are illustrative and by way of example only, and other system elements may be monitored. For example, instead of being standalone elements as illustrated in FIG. 1, some or all of the elements of IT system 100 monitored by the computer 110, as well as the computer 110, may be rack-mounted equipment. Although illustrated in FIG. 1 as a single computer 110, multiple computers may provide the performance monitoring functionality herein. Finally, while network 190 is represented as a single entity it may, in fact, comprise a number of different networks.

In some embodiments, operator 130 uses workstation 120 for viewing displays generated by monitoring computer 110, and for providing functionality for operator 130 to take corrective actions when an alarm is triggered. In some embodiments, operator 130 may use computer 110, instead of separate workstation 120.

Figure 2:
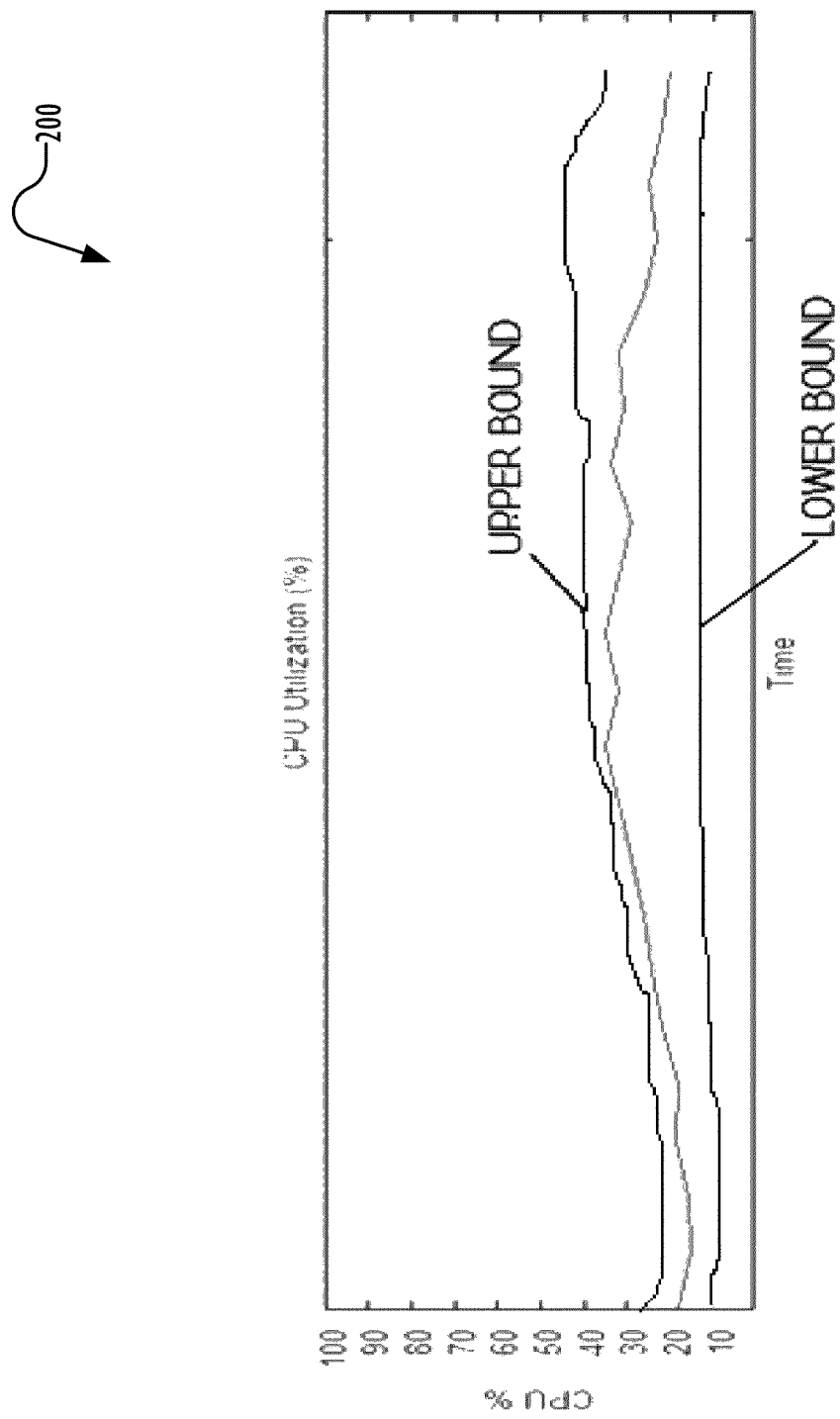
FIG. 2 illustrates, in graph form, exemplary baseline patterns for a performance monitoring metric.

A baseline is generally defined as the range of normal behavior for a system or application metric with a lower bound and an upper bound. Illustrative system and application metrics include, but are not limited to, CPU utilization, memory free (MB), etc. According to one embodiment, the lower and upper bounds of a baseline are defined as the 5% and 95% percentile lines based on the metric's operating range for a specified time period (e.g., one day, one week or one month). FIG. 2 is an example baseline for one instance of a processing unit or CPU utilization metric. A metric's current behavior is generally considered abnormal if it is outside the range defined by the baseline's upper and lower bounds.

Figure 3:
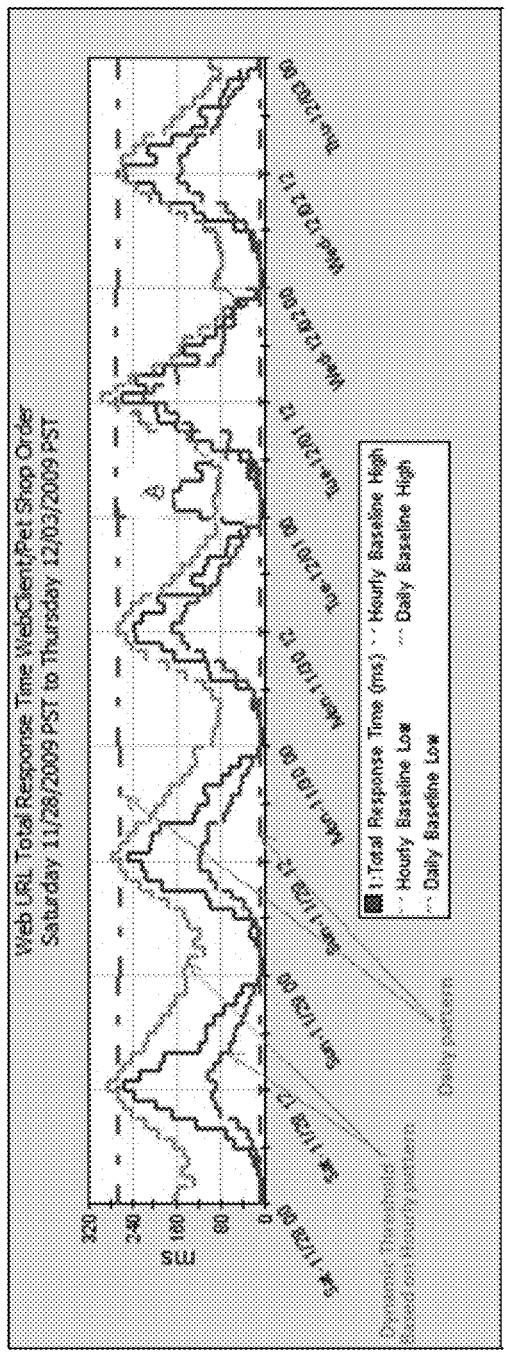
FIG. 3 illustrates, in graph form, an exemplary determination of dynamic threshold according to one embodiment.

In one embodiment, a performance management system automatically establishes a baseline for every metric it collects. As metric data comes into the system (i.e., is collected by the system), the performance management system analyzes, performs computations and groups them into different time-based categories of data patterns. Baselines are established for each of the categories of data patterns. Illustrative categories of baseline patterns include, but are not limited to: 1 min pattern, 30 min pattern, hourly pattern, daily pattern, and weekly pattern, etc. More categories of baseline patterns may be added as needed. FIG. 3 illustrates two exemplary baselines patterns: hourly pattern and daily pattern.

These baseline patterns are used in defining the thresholds of the monitored metrics. According to one embodiment, as a performance management system receives metric data, it analyzes the data against each of the baseline patterns to perform pattern matching analysis to find a matching pattern. As a skilled person in the art would know, pattern matching analysis may be conducted in many ways. One embodiment performs the pattern matching analysis for each attribute (e.g., correlation analysis). A correlation coefficient is computed for each attribute. If a correlation coefficient for each attribute is greater than a pre-specified threshold, the selected pattern is regarded as a matching pattern. The pre-specified threshold of the correlation coefficient varies depending on the needs of the pattern matching, and may be configured by an administrator. In one embodiment, the pre-specified threshold for correlation coefficient may be 0.6. There are many well known techniques to generate a correlation coefficient. One illustrative technique is the Pearson Product technique.

Figure 4A:
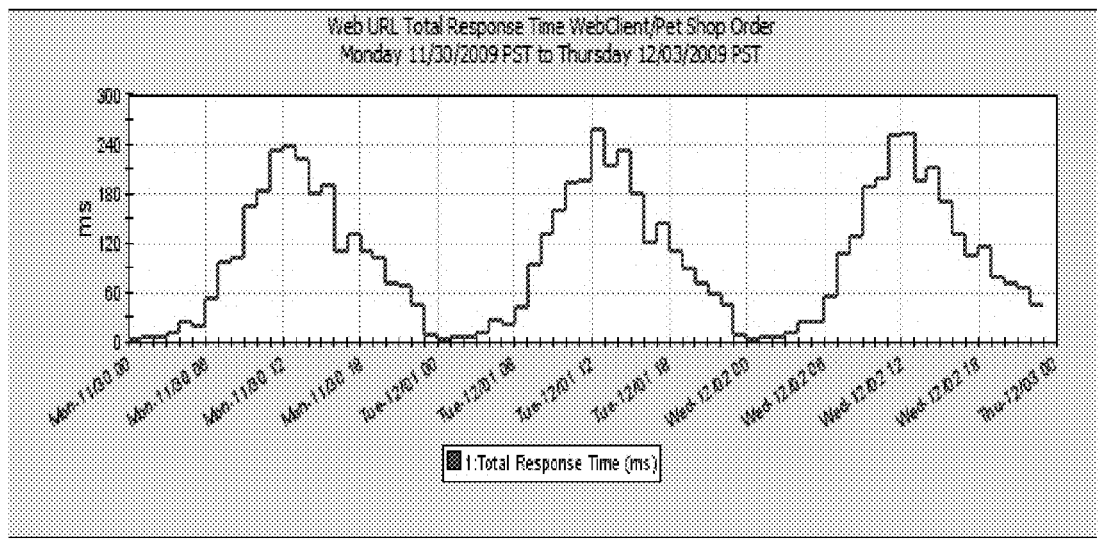
FIGS. 4A and 4B illustrate, in graph form, exemplary performance data that would match a certain pattern.
Figure 4B:
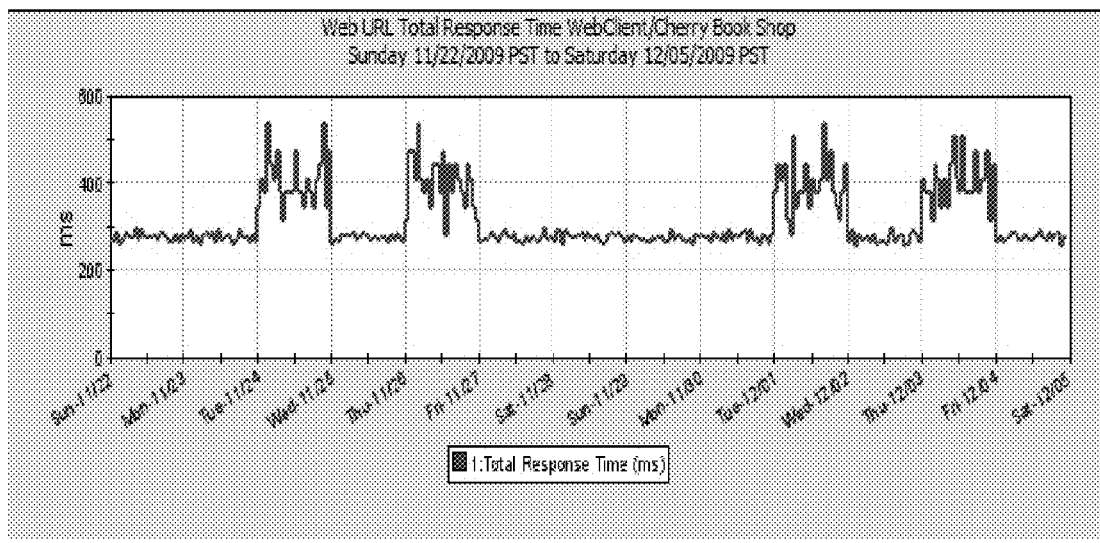

FIG. 4A illustrates exemplary performance data that would match an hour-of-day pattern. Note that the performance data for individual days are very similar. FIG. 4B is another example that shows the day-of-week pattern is the most likely match. Note that the data behavior is different on Tuesdays and Thursdays.

If the metric is found to follow a baseline pattern, the baseline of that pattern is selected as a possible dynamic threshold for that metric. The performance management system conducts a series of sanity checks on the data and the selected baseline to ensure that using the baseline as the new dynamic threshold will still result in accurate detection of abnormalities, and reduce the chance of false alarm creation. By way of example, sanity checks include, but are not limited to:

SLOW, STEADY INCREASE PATTERN—where raw data increases steadily over time, for example, disk usage. The baseline will not be able to keep up with the changes.

SLOW, STEADY DECREASE PATTERN—where raw data decreases steadily over time, the baseline will not be able to keep up with the changes.

LONG-LASTING ALARMS—applies recent raw data to the threshold using the new baseline. If long-persisting alarms (6 or more hours) are created as a result, it is generally not appropriate to use the baseline as the new dynamic threshold.

MORE ALARMS—applies recent raw data to the threshold using the new baseline, if more alarms are created as a result, it is generally not appropriate to use the baseline as the new dynamic threshold.

In one embodiment, the performance management performs sanity checks by comparing data at different intervals based on the matching baseline pattern. For example, if after the pattern matching analysis, the performance management system finds the metric data matches the hourly baseline pattern, the performance management system may perform sanity checks by comparing data from hour #1 with data from hour #2, and comparing data from hour #2 with data from hour #3, and so on, to determine whether the data follows "slow, steady increase pattern" or "slow, steady decrease pattern." Alternatively, the performance management system may compute a slope of the data collected at different intervals to determine whether the data follows "slow, steady increase pattern" or "slow, steady decrease pattern."

If the baseline of the matching pattern passes the sanity checks, it will be used as the new dynamic threshold of the metric. Referring back to FIG. 3, the metric data in that graph follows the hourly pattern. The performance management system creates a dynamic threshold based on the baseline of the hourly pattern. As a result of the new dynamic threshold, it can detect an abnormality at point A. On the other hand, triggering any of the sanity checks can invalidate the new baseline. If a first baseline pattern is rejected, the performance management system selects a next baseline pattern and performs pattern matching amongst that pattern.

Figure 5:
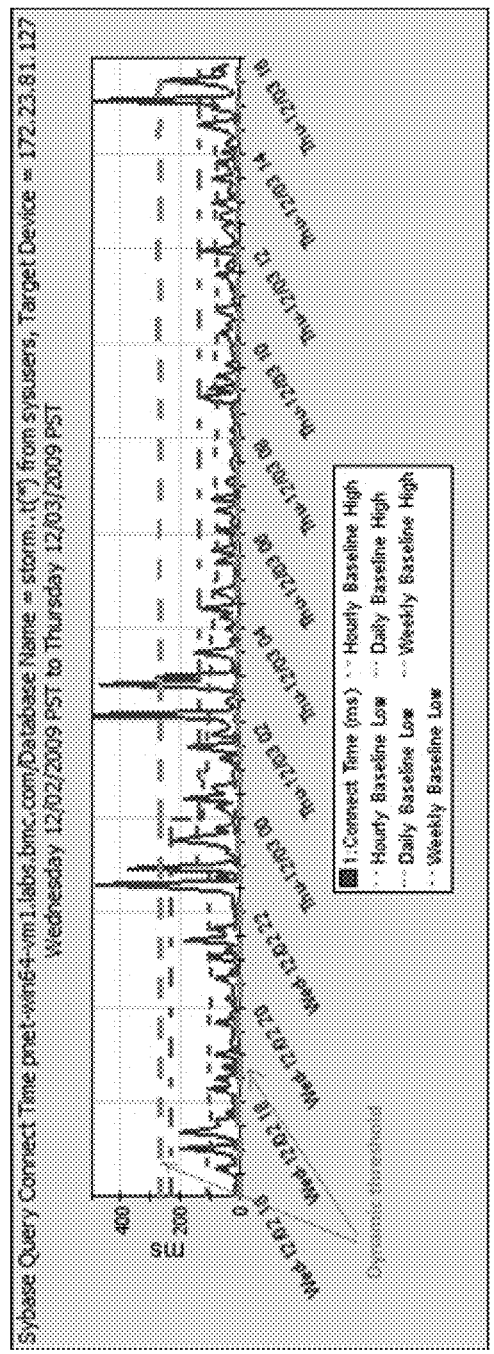
FIG. 5 illustrates, in graph form, another exemplary determination of dynamic threshold according to one embodiment.

If after all baseline patterns have been checked, no matching pattern is found, or the baseline of the matched patterned fails the sanity checks, the metric data may be considered as not following any pattern. In such a case, the performance management system can use a composite of the baselines as the dynamic threshold of the metric. The composite of the baselines denotes an operating range for a metric. In one embodiment, the composite of the baselines is defined as [max(HBL, DBL, WBL, current Threshold), min(HBL, DBL, WBL, current Threshold)], where HBL, DBL and WBL are hourly, daily and weekly baselines respectively. Therefore, the composite of baselines takes the maximum of the given threshold and available baselines as the upper bound, and the minimum of the given threshold and available baselines as the lower bound. FIG. 5 shows a metric that does not follow any pattern. As shown in the graph, the different baseline patterns tend to fail to capture the abnormal behavior. A dynamic threshold is created based on a composite of all baseline patterns. With respect to the new dynamic threshold, most of the data spikes do not result in abnormality events and those that do might be significant enough to acknowledge and address.

Figure 6:
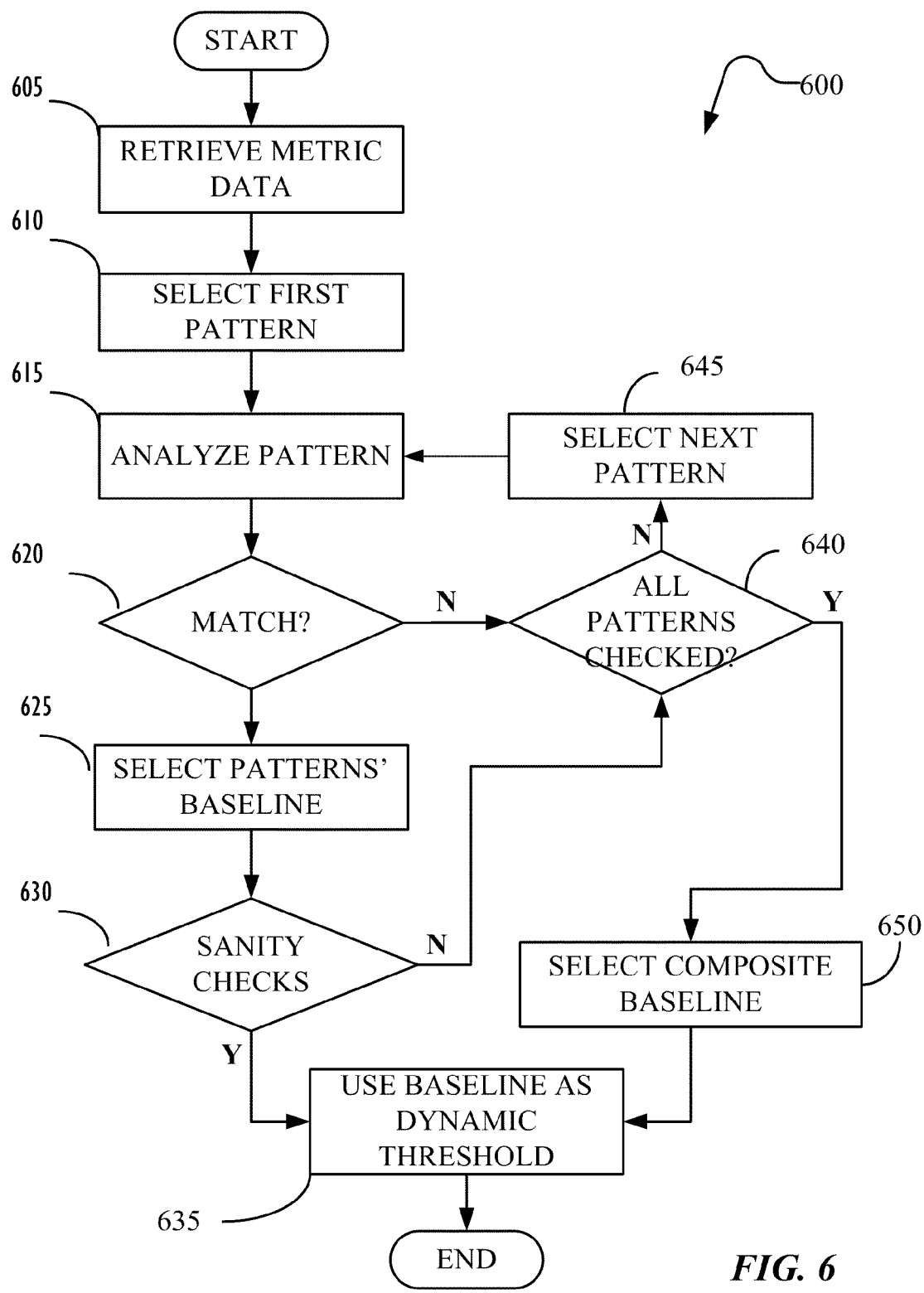
FIG. 6 illustrates, in flowchart form, a technique for automatically determining a dynamic threshold according to one embodiment.

Referring now to FIG. 6, one embodiment of a method 600 for automatically determining dynamic thresholds for accurate detection of abnormalities is illustrated. The performance management system can periodically initiate process 600 to examine the performance data for one or more metrics and to make the determination which baseline pattern is best to use as dynamic thresholds for individual metrics.

The performance management system receives the metric data, step 605. The performance management system then identifies a set of time-based baseline patterns. Each of the baseline patterns has a predetermined baseline. At step 610, the performance management system selects a first baseline pattern for pattern matching analysis. The computation of a correlation coefficient and correlation analysis are performed at step 615. One of ordinary skill in the art will recognize that there are many known pattern matching techniques. The use of correlation analysis herein is only by way of example. If an attribute's correlation coefficient is greater than the pre-specified threshold, a matching pattern has been found, decision 620. The baseline value of the matching pattern is selected as the potential new dynamic threshold at step 625. A series of sanity checks may then be performed against the newly selected baseline, step 630. Should the selected baseline pass the sanity checks, the performance management system uses the baseline as the new dynamic threshold, step 635.

However, if the metric data does not match the selected baseline pattern, decision 620 no prong, or if the baseline of the matching pattern fails the sanity checks, decision 630 no prong, the performance management system checks whether there are any more baseline patterns to be analyzed, decision 640. If there are more baseline patterns to match against, decision 640 no prong, the next baseline pattern is selected for matching analysis, step 645. The pattern matching steps described above may then be repeated for the newly selected pattern. If an analysis has been conducted on all baseline patterns without having identified a match, decision 640 yes prong, the performance management system can select a composite of the baselines, step 650, and uses the composite of the baselines as the new dynamic threshold, step 635.

Figure 7:
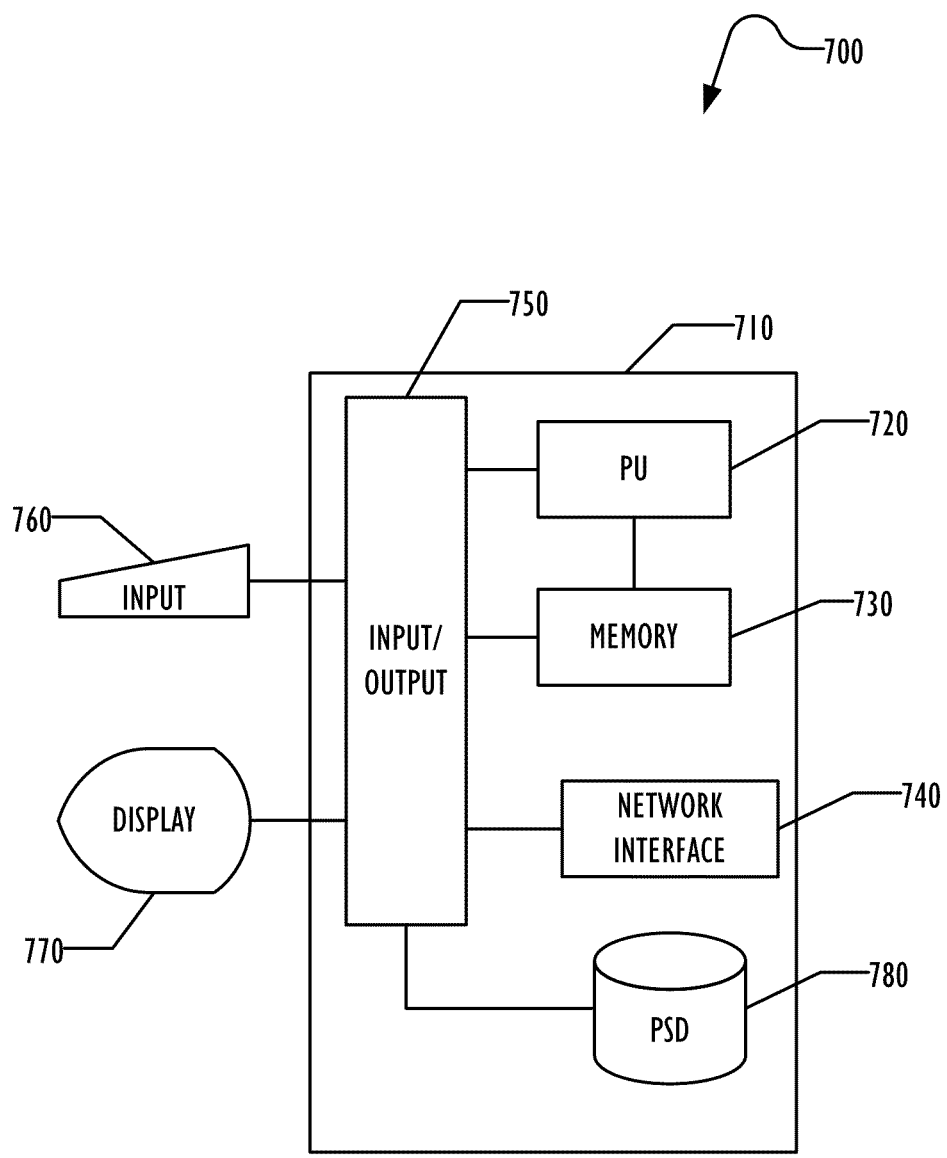
FIG. 7 illustrates, in block diagram form, an example computer system used for performing a technique for automatically determining dynamic threshold according to one embodiment.

Referring now to FIG. 7, example computer 700 for use in automatically determining dynamic thresholds is illustrated in block diagram form. Example computer 700 comprises system unit 710 which may be optionally connected to an input device or system 760 (e.g., keyboard, mouse, touch screen, etc.) and display 770. Program storage device (PSD) 780 is included with system unit 710. Also included with system unit 710 is network interface 740 for communication via a network with other computing and corporate infrastructure devices (not shown). Network interface 740 may be included within system unit 710 or be external to system unit 710. In either case, system unit 710 may be communicatively coupled to network interface 740. Program storage device 780 represents any form of non-volatile storage including, but not limited to, all forms of optical and magnetic storage, including solid-state storage elements and removable media. Program storage device 780 may be used for storage of software to control system unit 710 or for data for use by the computer 700, or both.

System unit 710 may be programmed to perform methods in accordance with this disclosure (an example of which is shown in FIG. 6). System unit 710 comprises processor unit (PU) 720, input-output (I/O) interface 750 and memory 730. Processing unit 720 may include any programmable controller device including, for example, one or more members of the Intel Atom®, Core®, Pentium® and Celeron® processor families from the Intel, Sun SPARC® processor families from Sun and the Cortex and ARM processor families from ARM. (INTEL, INTEL ATOM, CORE, PENTIUM, and CELERON are registered trademarks of the Intel Corporation. CORTEX is a registered trademark of the ARM Limited Corporation. ARM is a registered trademark of the ARM Limited Company. SPARC is a registered trademark of the SPARC International, Inc.) Memory 730 may include one or more memory modules and comprise random access memory (RAM), read only memory (ROM), programmable read only memory (PROM), programmable read-write memory, and solid-state memory. One of ordinary skill in the art will also recognize that PU 720 may also include some internal memory including, for example, cache memory.

Various changes in the components as well as in the details of the illustrated operational method are possible without departing from the scope of the following claims. For instance, the illustrative system of FIG. 7 may be comprised of more than one computer communicatively coupled via a communication network, wherein the computers may be mainframe computers, minicomputers, workstations or any combination of these. Further, monitored applications may execute on multiple hardware platforms. Such a network may be composed of one or more local area networks, one or more wide area networks, or a combination of local and wide-area networks. In addition, the networks may employ any desired communication protocol and further may be "wired" or "wireless." In addition, acts in accordance with FIG. 6 may be performed by a programmable control device executing instructions organized into one or more program modules. A programmable control device may be a single computer processor, a special purpose processor (e.g., a digital signal processor, "DSP"), a plurality of processors coupled by a communications link or a custom designed state machine. Custom designed state machines may be embodied in a hardware device such as an integrated circuit including, but not limited to, application specific integrated circuits ("ASICs") or field programmable gate array ("FPGAs"). Storage devices suitable for tangibly embodying program instructions include, but are not limited to: magnetic disks (fixed, floppy, and removable) and tape; optical media such as CD-ROMs and digital video disks ("DVDs"); and semiconductor memory devices such as Electrically Programmable Read-Only Memory ("EPROM"), Electrically Erasable Programmable Read-Only Memory ("EEPROM"), Programmable Gate Arrays and flash devices.

It is to be understood that the above description is intended to be illustrative, and not restrictive. For example, the above-described embodiments may be used in combination with each other. Many other embodiments will be apparent to those of skill in the art upon reviewing the above description. The scope of the invention therefore should be determined with reference to the appended claims, along with the full scope of equivalents to which such claims are entitled. In the appended claims, the terms "including" and "in which" are used as the plain-English equivalents of the respective terms "comprising" and "wherein."

What is claimed is:

1. A method for monitoring performance of an information technology system, the method comprising:
   retrieving, by a microprocessor of a computing device, data for a metric, said metric indicative of one or more operating parameters of the information technology system;
   identifying, by the microprocessor, a set of baseline patterns of the metric, each of the set of baseline patterns having a baseline;
   determining, by the microprocessor, whether the data matches one of the set of baseline patterns;
   if the data matches a first baseline pattern, selecting, by the microprocessor, a first baseline of the first baseline pattern as a possible dynamic threshold for the metric;
   or selecting a composite baseline if there is no matching pattern;
   evaluating the first baseline by conducting at least one sanity check on the first baseline to ensure that using the first baseline for the metric will result in accurate detection of abnormalities for the metric;
   if the first baseline passes the at least one sanity check, applying the first baseline as a new event threshold of the metric, to dynamically adjust an event threshold for the metric.

2. The method of claim 1, further comprising:
   performing pattern matching analysis on the selected baseline pattern.

3. The method of claim 2, wherein the act of performing pattern matching analysis on the selected baseline pattern comprises performing correlation analysis on the selected baseline pattern.

4. The method of claim 3, wherein the act of performing correlation analysis comprises:
   generating a correlation coefficient using a correlation coefficient generating technique; and
   returning a matching status if the correlation coefficient is greater than a prespecified threshold value.

5. The method of claim 4, wherein the pre-specified threshold value is configurable.

6. The method of claim 1, wherein the at least one sanity check comprises a slow, steady increase pattern.

7. The method of claim 1, wherein the at least one sanity check comprises a slow, steady decrease pattern.

8. The method of claim 1, wherein the at least one sanity check comprises a longlasting alarms pattern.

9. The method of claim 1, wherein the at least one sanity check comprises a more alarms pattern.

10. The method of claim 1, wherein the act of selecting a composite baseline comprises generating the composite baseline by:
    setting a minimum value amongst the baselines of the set of baseline patterns and a current threshold of the metric data as a lower bound of the composite baseline; and
    setting a maximum value amongst the baselines of the set of baseline patterns and the current threshold of the metric data as an upper bound of the composite baseline.

11. A performance monitoring system, comprising:
    a processor;
    an operator display, coupled to the processor;
    a storage subsystem, coupled to the processor; and
    a software, stored by the storage subsystem, comprising instructions that when executed by the processor cause the processor to perform the method of claim 1.

12. A programmable storage device having programmed instructions stored thereon for causing a programmable control device to perform a method according to claim 1.

13. A networked computer system comprising:
    a plurality of computers communicatively coupled, at least one of the plurality of computers programmed to perform at least a portion of the method of claim 1 wherein the entire method of claim 1 is performed collectively by the plurality of computers.

14. A method for monitoring performance of an information technology system, the method comprising:
    retrieving, by a microprocessor of a computing device, data for a metric, said metric indicative of one or more operating parameters of the information technology system;
    identifying, by the microprocessor, a set of baseline patterns of the metric, each of the set of baseline patterns having a baseline;
    selecting, by the microprocessor, a baseline pattern from the set of baseline patterns;
    performing pattern matching analysis on the selected baseline pattern;
    selecting a first baseline of a matching pattern if the act of performing pattern matching analysis identifies the matching pattern;
    evaluating the first baseline by conducting at least one sanity check on the first baseline to ensure that using the first baseline for the metric will result in accurate detection of abnormalities for the metric; and
    if the first baseline passes the at least one sanity check, applying the first baseline as a new event threshold of the metric, to dynamically adjust an event threshold for the metric.

15. The method of claim 14, wherein the act of performing pattern matching analysis on the selected baseline pattern comprises performing correlation analysis on the selected baseline pattern.

16. The method of claim 15, wherein the act of performing correlation analysis comprises:
    generating a correlation coefficient using a correlation coefficient generating technique; and
    returning a matching status if the correlation coefficient is greater than a prespecified threshold value.

17. A programmable storage device having programmed instructions stored thereon for causing a programmable control device to perform a method according to claim 14.

* * * * *

UNITED STATES PATENT AND TRADEMARK OFFICE
CERTIFICATE OF CORRECTION

| | | |
|---|---|---|
| PATENT NO. | : 8,457,928 B2 | Page 1 of 1 |
| APPLICATION NO. | : 12/847391 | |
| DATED | : June 4, 2013 | |
| INVENTOR(S) | : Derek Dang et al. | |

It is certified that error appears in the above-identified patent and that said Letters Patent is hereby corrected as shown below:

On the Title Page, item (75), under "Inventors", in column 1, line 3, delete "Lafaive," and insert -- Lefaive, --, therefor.

On the Title Page, item (75), under "Inventors", in column 1, line 3, delete "Mountainview," and insert -- Mountain View, --, therefor.

On Title page 2, in column 1, item (56), under "Other Publications", line 6, delete "Austrailia" and insert -- Australia --, therefor.

Signed and Sealed this
First Day of October, 2013

Teresa Stanek Rea
*Deputy Director of the United States Patent and Trademark Office*